United States Patent
Yasaki et al.

(10) Patent No.: US 8,365,296 B2
(45) Date of Patent: Jan. 29, 2013

(54) INFORMATION PROCESSING APPARATUS, INFORMATION PROCESSING METHOD AND COMPUTER READABLE MEDIUM HAVING A PROGRAM

(75) Inventors: Kouichi Yasaki, Kawasaki (JP); Kazuaki Nimura, Kawasaki (JP); Yousuke Nakamura, Kawasaki (JP); Fumio Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 12/500,919

(22) Filed: Jul. 10, 2009

(65) Prior Publication Data
US 2010/0024041 A1 Jan. 28, 2010

(30) Foreign Application Priority Data
Jul. 24, 2008 (JP) .................. 2008-191345

(51) Int. Cl.
  *G06F 7/04* (2006.01)
  *G06F 12/14* (2006.01)
  *H04N 7/16* (2006.01)
(52) U.S. Cl. ............ 726/26; 380/30; 380/201; 380/202; 380/203; 380/204; 700/225; 700/226; 700/227; 705/18; 711/164; 713/187
(58) Field of Classification Search ............. 726/26
See application file for complete search history.

(56) References Cited

U.S. PATENT DOCUMENTS

| | | | |
|---|---|---|---|
| 6,778,905 B2 | 8/2004 | Horikami | |
| 6,826,665 B1 | 11/2004 | Nambu | |
| 2004/0107199 A1* | 6/2004 | Dalrymple et al. | 707/100 |
| 2004/0186765 A1* | 9/2004 | Kataoka | 705/10 |
| 2004/0253965 A1* | 12/2004 | Sato et al. | 455/456.3 |
| 2009/0144341 A1* | 6/2009 | Hauck et al. | 707/202 |

FOREIGN PATENT DOCUMENTS

| | | |
|---|---|---|
| JP | 2000-305852 | 11/2000 |
| JP | 2000-308126 | 11/2000 |
| JP | 2001-028658 | 1/2001 |
| JP | 2001-075873 | 3/2001 |

(Continued)

OTHER PUBLICATIONS

Clark, Tom. Strategies for Data Protection (First Edition) © 2008 Brocade Communications Systems, Inc. Retrievd online Apr. 20, 2012.*

(Continued)

*Primary Examiner* — James A Reagan
(74) *Attorney, Agent, or Firm* — Staas & Halsey LLP

(57) ABSTRACT

An information processing apparatus and method configured to access multiple external storage medium. The apparatus and method detect theft or loss (or otherwise unauthorized use) of the information processing apparatus with respect to data stored in multiple storage areas, back up the data to the storage medium, and record, in association with each of the storage medium, an easiness degree indicating how easily a user accesses the storage medium. The apparatus and method calculate erasure priority rankings of the data stored in a manner that an erasure priority ranking is higher as an easiness degree is higher, record the calculated erasure priority rankings in association with each of the multiple storage areas, and erases the data stored in the multiple storage areas in accordance with the erasure priority rankings when detecting theft or loss of the information processing apparatus.

7 Claims, 10 Drawing Sheets

FOREIGN PATENT DOCUMENTS

| | | |
|---|---|---|
| JP | 2002-016539 | 1/2002 |
| JP | 2002-62156 | 2/2002 |
| JP | 2002-183866 | 6/2002 |
| JP | 2005-149254 | 6/2005 |
| JP | 2005149254 A * | 6/2005 |

OTHER PUBLICATIONS

Japanese Office Action dated Jul. 3, 2012 which issued in corresponding Japanese Patent Application No. 2008-191345.

* cited by examiner

FIG. 2

| STORAGE AREA | ADDRESS | BACKUP DESTINATION |
|---|---|---|
| STORAGE AREA 1 | 009~000A | SERVER APPARATUSES 3e, 3f |
| STORAGE AREA 2 | 00B~000F | USB MEMORY 3b, SERVER APPARATUS 3f |
| STORAGE AREA 3 | 001F~00FF | USB MEMORIES 3a, 3c, 3d |
| STORAGE AREA 4 | 01FF~0FFF | NOT YET |
| STORAGE AREA 5 | 0000~0008 | — |

FIG. 3

| EXTERNAL STORAGE MEDIUM | CONNECTION METHOD | EASINESS DEGREE | ACCESS SPEED | LAST ACCESS TIME |
|---|---|---|---|---|
| USB MEMORY 3a | LOCAL BUS | 33% | 12Mbps | JUNE 12 15:00 |
| USB MEMORY 3b | LOCAL BUS | 33% | 480Mbps | JUNE 12 15:00 |
| USB MEMORY 3c | LOCAL BUS | 66% | 100Mbps | JUNE 12 15:00 |
| USB MEMORY 3d | WIRELESS | 100% | 100Mbps | JUNE 11 21:00 |
| SERVER APPARATUS 3e | INTERNET | 0 | 1Mbps | JUNE 12 8:00 |
| SERVER APPARATUS 3f | INTRANET | 0 | 10Mbps | JUNE 12 15:00 |

| TIME | EXTERNAL STORAGE MEDIUM WHICH COULD BE ACCESSED |
|---|---|
| JUNE 11 21:00 | USB MEMORY 3d, SERVER APPARATUS 3e |
| JUNE 12 8:00 | USB MEMORY 3c, SERVER APPARATUS 3e, 3f |
| JUNE 12 15:00 | USB MEMORIES 3a TO 3c, SERVER APPARATUS 3f |

FIG. 5

| STORAGE AREA | ADDRESS | BACKUP DESTINATION | ERASURE PRIORITY RANKING |
|---|---|---|---|
| STORAGE AREA 1 | 009~000A | SERVER APPARATUSES 3e, 3f | 3 |
| STORAGE AREA 2 | 00B~000F | USB MEMORY 3b, SERVER APPARATUS 3f | 2 |
| STORAGE AREA 3 | 001F~00FF | USB MEMORIES 3a, 3c, 3d | 4 |
| STORAGE AREA 4 | 01FF~0FFF | NOT YET | 5 |
| STORAGE AREA 5 | 0000~0008 | — | 1 |

| DETECTION LEVEL | WAITING TIME |
|---|---|
| DETECTION LEVEL "1" | 1 HOUR |
| DETECTION LEVEL "2" | 10 MINUTES |
| DETECTION LEVEL "3" | 0 |

| STORAGE AREA | ADDRESS | BACKUP DESTINATION | ERASURE PRIORITY RANKING |
|---|---|---|---|
| STORAGE AREA 1 | 009~000A | SERVER APPARATUS 3f (MEDIA RANKING "1") <br> SERVER APPARATUS 3e (MEDIA RANKING "6") | 3 |
| STORAGE AREA 2 | 00B~000F | SERVER APPARATUS 3f (MEDIA RANKING "1") <br> USB MEMORY 3b (MEDIA RANKING "4") | 2 |
| STORAGE AREA 3 | 001F~00FF | USB MEMORY 3d (MEDIA RANKING "2") <br> USB MEMORY 3c (MEDIA RANKING "3") <br> USB MEMORY 3a (MEDIA RANKING "5") | 4 |
| STORAGE AREA 4 | 01FF~0FFF | NOT YET | 5 |
| STORAGE AREA 5 | 000~0008 | — | 1 |

INFORMATION PROCESSING APPARATUS, INFORMATION PROCESSING METHOD AND COMPUTER READABLE MEDIUM HAVING A PROGRAM

CROSS-REFERENCE TO RELATED APPLICATIONS

This application claims the benefit of priority from Japanese Patent Application No. 2008-191345 filed on Jul. 24, 2008, which is herein incorporated by reference in its entirety.

BACKGROUND

1. Field

The present invention relates to an information processing apparatus configured to access multiple external storage media, an information processing method and a computer-readable medium embodying a program therefore.

2. Description of the Related Art

Recently, personal computers (information processing apparatuses) which can be easily carried, for example, like a notebook computer have been spreading. Along with the popularization of the personal computers or the like, chances of having a personal computer stolen or losing it are increasing. If a personal computer is lost and found by a third person, there is a possibility that various data, such as personal data, company data and important data, stored in the personal computer is obtained by the third person.

Accordingly, there has been a typical technique for providing a detection section for detecting theft or loss of a personal computer for the personal computer (see Japanese Patent Laid-Open No. 2000-305852, Japanese Patent Laid-Open No. 2002-16539, Japanese Patent Laid-Open No. 2002-183866 and Japanese Patent Laid-Open No. 2002-62156). According to this technique, a user of a personal computer first backs up data stored in the personal computer to one or multiple external storage media (for example, a USB memory, a server apparatus and the like) in advance. Hereinafter, data generated in an external storage medium by backup will be referred to as backup data.

After that, if the detection section detects theft or loss of the personal computer, a data erasure section provided for the personal computer erases the data stored in the personal computer. Thereby, it is possible to prevent the data stored in the personal computer from being obtained by a third person. In the case where a large amount of data is stored in the personal computer, several hours may be required until erasure of the data by the data erasure section is completed.

By downloading the backup data from the external storage medium to a new personal computer, it is possible to restore the data which had been stored in the personal computer previously used before the time point of backup.

SUMMARY

An information processing apparatus and method thereof disclosed below is capable of accessing multiple external storage media. An information processing apparatus according to an embodiment includes a detection section which detects theft or loss (unauthorized use, loss of control, etc.) of the information processing apparatus, a storage section having multiple storage areas for storing data, and a backup management section which backs up the data stored in the multiple storage areas to one or multiple external storage media.

According to an embodiment, the information processing apparatus includes an easiness degree recording section which records, in association with each of the multiple external storage media, an easiness degree indicating how easily a user accesses the external storage medium, an erasure priority ranking calculation section which calculates erasure priority rankings of the data stored in the multiple storage areas in a manner that an erasure priority ranking is higher as an easiness degree is higher, and records the calculated erasure priority rankings into an erasure priority ranking recording section in association with each of the multiple storage areas.

The information processing apparatus includes a data erasure section which erases (destroys) the data stored in the multiple storage areas in accordance with the erasure priority rankings recorded in the erasure priority ranking recording section when the detection section detects theft or loss (or otherwise unauthorized use, loss of control) of the information processing apparatus.

The above-described embodiments of the present invention are intended as examples, and all embodiments of the present invention are not limited to including the features described above. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 illustrates an example of backup information recorded in a backup management section;

FIG. 3 illustrates an example of state information recorded in a backup device state recording section;

FIG. 4 illustrates an example of log information recorded in a log information recording section;

FIG. 5 illustrates an example of erasure priority rankings recorded in an erasure priority ranking recording section;

FIG. 6 illustrates an example of a waiting time recorded in a waiting time recording section;

FIG. 9 is a diagram for illustrating processing for determining an erasure priority rankings of storage areas 1 to 3.

DETAILED DESCRIPTION OF EMBODIMENTS

Figure 1:
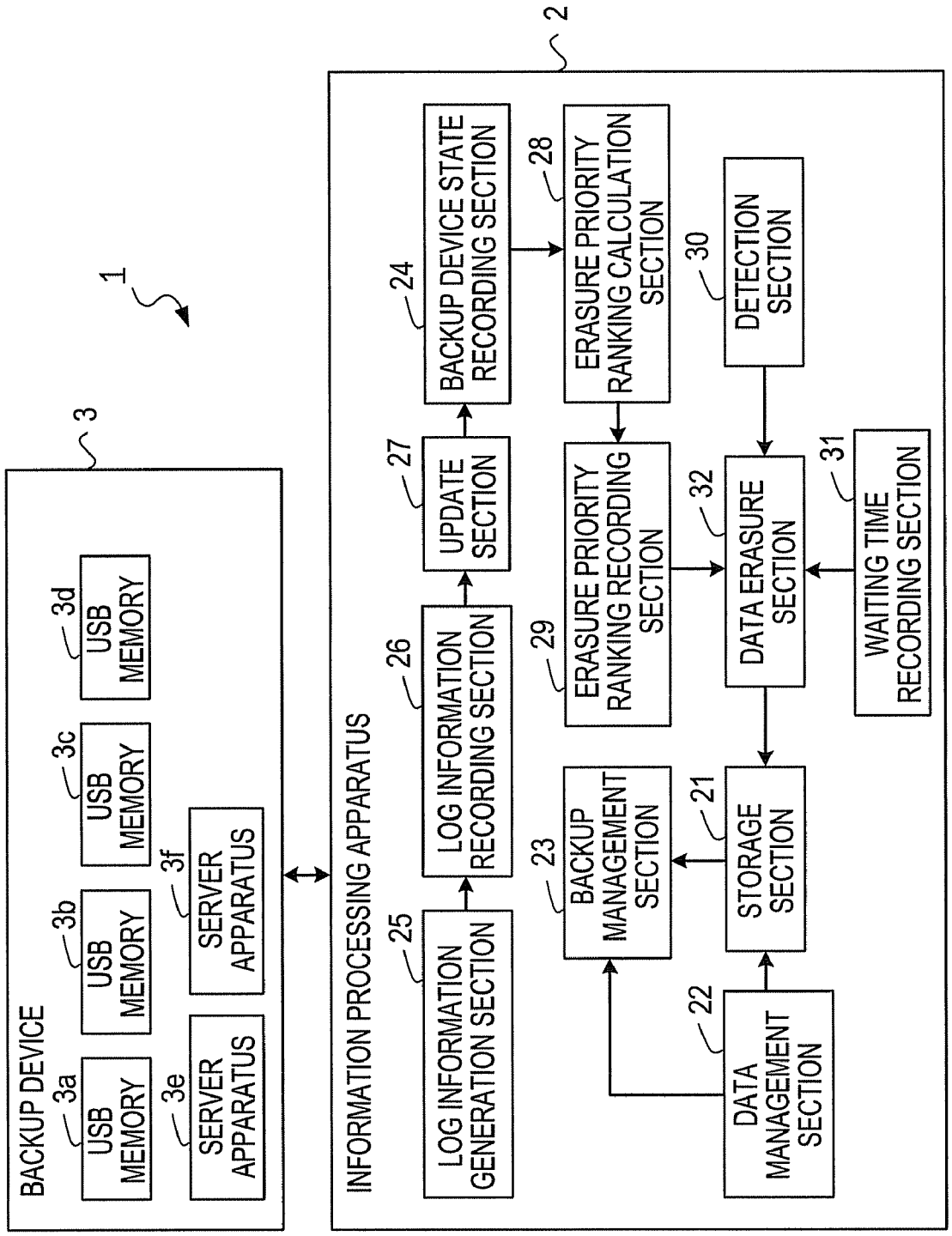
FIG. 1 illustrates a schematic configuration of a data erasure system according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Typically, it has sometimes happened that, though a personal computer is not stolen or lost, the personal computer erroneously detects theft or loss depending on a state of use by its user. For example, a case will be considered where a personal computer is provided with a detection section which detects that the personal computer is stolen or lost when a distance between the personal computer and its user is equal to or above a given value. In this case, if, for example, the user goes out leaving the personal computer on the desk, the distance between the user and the personal computer becomes equal to or above the given value, and therefore, the detection section erroneously detects that the personal computer has been stolen or lost though it has not been stolen or lost. Therefore, a data erasure section starts erasure of data stored in the personal computer.

Even if the data erasure section starts erasure of the data, it is possible to stop the erasure of the data by the data erasure section if the user is identified by the user performing authentication processing for the personal computer. That is, even if the detection section makes an erroneous detection, erasure of data by the data erasure section can be stopped by a user instruction. In this case, it is necessary for the user to download backup data from an external storage medium to restore data erased by the data erasure section among the data stored in the personal computer. However, when the user cannot easily access the external storage medium in which the backup data is stored, for example, when the external storage medium is kept at a place different from the place where the user stays, the user has to go and get the external storage medium, and it is troublesome. Furthermore, it may not be possible to quickly download the backup data.

An information processing apparatus and method disclosed below is capable of quickly restoring data without troubling a user even including when a detection section for detecting theft or loss makes an erroneous detection.

An information processing apparatus according to an embodiment of the present invention is capable of accessing multiple external storage media. The information processing apparatus includes a detection section which detects theft or loss of the information processing apparatus itself, a storage section having multiple storage areas for storing data, a backup management section which backs up the data stored in the multiple storage areas to one or multiple external storage media, an easiness degree recording section which records, in association with each of the multiple external storage media, an easiness degree indicating how easily a user accesses the external storage medium, an erasure priority ranking calculation section which calculates erasure priority rankings of the data stored in the multiple storage areas in a manner that an erasure priority ranking is higher as an easiness degree is higher, and records the calculated erasure priority rankings into an erasure priority ranking recording section in association with each of the multiple storage areas, and a data erasure section which erases the data stored in the multiple storage areas in accordance with the erasure priority rankings recorded in the erasure priority ranking recording section if the detection section detects theft or loss of the information processing apparatus.

An information processing method and a computer readable recording medium having a program based on substantially the same technical idea are also embodiments of the present invention.

According to the above configuration, the backup management section backs up data stored in multiple storage areas to one or multiple external storage media. The erasure priority ranking calculation section calculates erasure priority rankings of the data stored in the multiple storage areas in a manner that an erasure priority ranking is higher as an easiness degree is higher (in correspondence). The easiness degree indicates how easily a user can access the external storage medium. Then, the erasure priority ranking calculation section records the calculated erasure priority rankings into the erasure priority ranking recording section in association with each of the multiple storage areas. If the detection section detects theft or loss of the information processing apparatus, the data erasure section erases the data stored in the multiple storage areas in accordance with the erasure priority rankings recorded in the erasure priority ranking recording section. Therefore, even in a case where the detection section makes an erroneous detection, since erasure of data is first performed for a storage area where data which has been backed up to an external medium with a higher easiness degree is stored, it is possible to quickly restore the data without troubling the user when the user downloads the data generated in the external storage medium by backup to the information processing apparatus.

In an embodiment of the present invention, an aspect is preferable in which there is provided an access speed recording section which records, in association with each of the multiple external storage media, a speed of the information processing apparatus for accessing the external storage medium and the erasure priority ranking calculation section calculates erasure priority rankings of the data stored in the multiple storage areas in a manner that the erasure priority ranking is higher as the easiness degree is higher and an access speed is faster. According to this aspect, even in the case where the detection section makes an erroneous detection, since data backed up to an external storage medium with a higher easiness degree and a higher access speed is erased first, it is possible to quickly restore the data without troubling the user.

In an embodiment of the present invention, there are provided a log information recording section which records log information showing an external storage media which the information processing apparatus could access, among the multiple external storage media, in a time series and an easiness degree update section which updates the easiness degrees recorded in the easiness degree recording section on the basis of the log information recorded in the log information recording section. According to this aspect, the easiness degree update section can update the easiness degrees recorded in the easiness degree recording section on the basis of the log information.

In an embodiment of the present invention, the erasure priority ranking calculation section calculates the erasure priority ranking of the data stored in each of the multiple storage areas in a manner that the erasure priority ranking of data which has not been backed up to an external storage medium by the backup management section is the lowest. According to this aspect, since the data erasure priority ranking for a storage area storing data which has not been backed up is the lowest, it is possible to reduce the risk of the data being erased even if the detection section makes an erroneous detection.

In an embodiment of the present invention, the detection section detects theft or loss of the information processing apparatus by stages according to a degree of the theft or loss; there is provided a waiting time recording section which records a waiting time after the data erasure section ends erasure of data stored in one storage area among the multiple storage areas until starting erasure of data stored in the other storage areas, in association with each of multiple stages detected by the detection section and the data erasure section reads a waiting time corresponding to a stage at which the detection section detects theft or loss of the information processing apparatus, from the waiting time recording section, and erases the data stored in each of the multiple storage areas on the basis of the read waiting time. According to an aspect, the data erasure section can determine a time before erasing the data stored in each of the multiple storage areas in accordance with the stage where the detection section detects theft or loss of the information processing apparatus.

A more concrete embodiment of the present invention is described below with reference to drawings.

FIG. 1 illustrates a schematic configuration of a data erasure system 1 according to an embodiment. That is, the data erasure system 1 according to an embodiment is provided with an information processing apparatus 2 and backup devices 3. The information processing apparatus 2 may be a general-purpose personal computer or other portable device. However, this is not limiting, and the information processing apparatus 2 may be a personal digital assistant (PDA), a mobile phone or the like. The information processing apparatus 2 can access the backup devices 3. The backup devices 3 may include four USB (Universal Serial Bus) memories 3a to 3d and two server apparatuses 3e and 3f as external storage media. The number of USB memories and server apparatuses included in the backup devices 3 are not limited thereto, and any number is possible. The backup devices 3 may include any external storage media (such as FD, DVD, CD, MD and MO) other than the USB memories and the server apparatuses.

In an embodiment, it is assumed that the USB memories 3a to 3c are accessible from the information processing apparatus 2 via a local bus by directly connecting them to USB connectors (not illustrated) of the information processing apparatus 2. It is assumed that the USB memory 3d is wirelessly accessible from the information processing apparatus 2. Therefore, the USB memory 3d according to an embodiment is accessible from the information processing apparatus 2 without being connected to a USB connector of the information processing apparatus 2, unlike the USB memories 3a to 3c. It is assumed that the server apparatus 3e is accessible from the information processing apparatus 2 via the Internet. Furthermore, it is assumed that the server apparatus 3f is accessible from the information processing apparatus 2 via an intranet.

The information processing apparatus 2 is provided with a storage section 21, a data management section 22, a backup management section 23, a backup device state recording section 24, a log information generation section 25, a log information recording section 26, an update section 27, an erasure priority ranking calculation section 28, an erasure priority ranking recording section 29, a detection section 30, a waiting time recording section 31 and a data erasure section 32.

Here, each of the function(s) of the data management section 22, backup management section 23, log information generation section 25, update section 27, erasure priority ranking calculation section 28, detection section 30 and data erasure section 32 described above are realized by an operation device, such as a CPU, provided for the computer executing a given program. Therefore, the program for realizing each of the above function(s) or a recording medium in which the program is recorded is also an embodiment of the present invention. The storage section 21, the backup device state recording section 24, the log information recording section 26, the erasure priority ranking recording section 29 and the waiting time recording section 31 are realized by an internal storage device in the computer or a storage device which can be accessed from the computer.

The storage section 21 has multiple storage areas for storing data, and it includes, for example, an HDD (Hard Disk Drive) or an SSD (Solid State Drive). Data stored in the multiple storage areas may be user data such as personal data, company data and important data. As illustrated in FIG. 2, a storage section according to an embodiment has a storage area 1 (address: 0009 to 000A), a storage area 2 (address: 000B to 000F), a storage area 3 (address: 001F to 00FF), a storage area 4 (address: 01FF to 0FFF) and a storage area 5 (address: 0000 to 0008). The storage area 5 is assumed to be a temporary area.

The data management section 22 manages data to be written into the storage section 21. That is, as for data inputted by the user of the information processing apparatus 2, the data management section 22 writes the data into any of the storage areas 1 to 4. As for data generated by the OS (Operating System), the CPU and the like of the information processing apparatus 2, the data management section 22 writes the data into the storage area (temporary area) 5. When having written data into the storage section 21, the data management section 22 notifies the backup management section 23 that it has written the data into the storage section 21.

The backup management section 23 backs up data stored in the multiple storage areas to one or multiple external storage media. Specifically, when the backup management section 23 is notified by the data management section 22 that the data management section 22 has written data into the storage section 21, and the external storage medium can be accessed from the information processing apparatus 2, the backup management section 23 backs up the data stored in the storage areas 1 to 4 to the external storage medium. Then, the backup management section 23 records backup information, which is information about the backup, into an internal memory of the backup management section 23. The backup management section 23 may backup the data stored in the multiple storage areas to an external storage medium specified by the user in accordance with an instruction from the user.

FIG. 2 illustrates an example of the backup information recorded in the backup management section 23 according to an embodiment. That is, the backup management section 23 according to an embodiment records the backup information, for example, as a table 23a. As illustrated in FIG. 2, storage areas, addresses and backup destinations are recorded in the table 23a.

That is, the table 23a indicates that the backup management section 23 has backed up the data stored in the storage area 1 to the server apparatuses 3e and 3f. The table 23a also indicates that the backup management section 23 has backed up the data stored in the storage area 2 to the USB memory 3b and the server apparatus 3f. The table 23a also indicates that the backup management section 23 has backed up the data stored in the storage area 3 to the USB memories 3a, 3c and 3d. Furthermore, the table 23a indicates that the backup management section 23 has not backed up the data stored in the storage area 4 yet. Therefore, for the backup destination corresponding to the storage area 4 in the table 23a, "not yet" is recorded which indicates that the backup management section 23 has not performed backup yet. In an embodiment, since the storage area 5 is a temporary area, the backup management section 23 does not back up the data stored in the storage area 5. Therefore, for the backup destination corresponding to the storage area 5 in the table 23a, "-" is recorded which indicates that the backup management section 23 does not perform backup.

The backup device state recording section (the easiness degree recording section, the access speed recording section) 24 records state information about each of the multiple external storage media. FIG. 3 illustrates an example of state information recorded in the backup device state recording section 24 according to an embodiment. That is, the backup device state recording section 24 according to an embodiment records the state information about each of the multiple external storage media as a table 24a. As illustrated in FIG. 3, external storage media, connection methods, easiness degrees, access speeds, and the last access times are recorded in the table 24a as the state information.

Here, the connection method indicates a medium for the information processing apparatus 2 to access an external storage medium. The easiness degree indicates how easily a user can access an external storage medium. Specifically, the easiness degree is a probability that an external storage medium can be immediately accessed or used by the user. For example, when the external storage medium is near the user, the easiness degree is high. When the external storage medium is not near the user, the easiness degree is low. In an embodiment, the easiness degrees of the server apparatuses 3e and 3f are "0" because they are fixedly installed at certain places. The access speed is the access speed of the information processing apparatus 2 to access an external storage medium. The last access time is the time at which the information processing apparatus 2 could lastly access an external storage medium.

By detecting the states of the information processing apparatus 2 and the backup devices 3, the log information generation section 25 generates log information in which an external storage medium which the information processing apparatus 2 could access, among the multiple external storage media, is illustrated together with time information. The timing at which the log information generation section 25 generates the log information is not especially limited here. For example, the log information generation section 25 may generate the log information at a timing of the backup management section 23 backing up the data stored in the storage areas to an external storage medium or may generate the log information at given time intervals.

The log information generation section 25 records the generated log information into the log information recording section 26. FIG. 4 illustrates an example of log information recorded in the log information recording section 26 according to an embodiment. That is, the log information recording section 26 according to an embodiment records the log information, for example, as a table 26a. As illustrated in FIG. 4, the log information is recorded in the table 26a in a time series. That is, times and external storage media which the information processing apparatus 2 could access at the times are recorded in the table 26a.

The update section (easiness degree update section) 27 updates easiness degrees and last access times recorded in the backup device state recording section 24 on the basis of the log information recorded in the log information recording section 26. Specifically, the update section 27 updates the easiness degrees recorded in the backup device state recording section 24 in a manner that an external storage medium which the information processing apparatus 2 could access more often at the times illustrated in the log information is given a higher easiness degree. That is, when it is assumed that the user always holds the information processing apparatus 2 (or has flexible and easy access), it can be said that access to an external storage medium by the user is easy if the information processing apparatus 2 is always capable of accessing the external storage medium. Therefore, the update section 27 updates the easiness degree to be higher. Furthermore, the update section 27 updates the easiness degree recorded in the backup device state recording section 24 in a manner that an external storage medium which the information processing apparatus 2 could access less often at the times illustrated in the log information is given a lower easiness degree. That is, when it is assumed that the user always holds or is in possession of the information processing apparatus 2, it can be said that access to an external storage medium by the user is not easy if the information processing apparatus 2 is not always capable of accessing the external storage medium. Therefore, the update section 27 updates the easiness degree to be lower. Thus, the easiness degree stored in the backup device state recording section 24 is updated depending on whether the information processing apparatus 2 could access the external storage medium.

The easiness degrees in the backup device state recording section 24 may be fixedly recorded by the use of the information processing apparatus 2. In this case, it is not necessary to provide the update section 27 described above for the information processing apparatus 2.

The erasure priority ranking calculation section 28 calculates an erasure priority ranking of the data stored in each of the multiple storage areas. Specifically, the erasure priority ranking calculation section 28 calculates the erasure priority rankings on the basis of the easiness degree of one or multiple external storage media to which the data stored in each of the multiple storage areas is backed up and the access speed of the one or multiple external storage media to which the data stored in each of the multiple storage areas is backed up. That is, the erasure priority ranking calculation section 28 calculates the erasure priority rankings in a manner that an erasure priority ranking is higher as an easiness degree is higher and/or an access speed is faster.

The erasure priority ranking calculation section 28 records the calculated erasure priority rankings into the erasure priority ranking recording section 29. FIG. 5 illustrates an example of erasure priority rankings recorded in the erasure priority ranking recording section 29 according to an embodiment. That is, the erasure priority ranking recording section 29 according to an embodiment records the erasure priority rankings, for example, as a table 29a. As illustrated in FIG. 5, storage areas, addresses, backup destinations and erasure priority rankings are recorded in the table 29a.

The detection section 30 detects theft or loss of the information processing apparatus 2 by stages according to a degree of the theft or loss. Specifically, the detection section 30 has multiple detection functions for detecting theft or loss of the information processing apparatus 2. In an embodiment, if only one detection function among the multiple detection functions operates, the detection section 30 generates a detection level "1". If two of the multiple detection functions operate, the detection section 30 generates a detection level "2". If three or more of the multiple detection functions operate, the detection section 30 generates a detection level "3". The detection section 30 notifies the data erasure section 32 that the information processing apparatus 2 has been stolen or lost.

There are various well-known techniques as the detection function(s) for detecting theft or loss of the information processing apparatus 2, and the functions are not especially limited here. For example, the detection function(s) include a detection function of detecting that the information processing apparatus 2 has been stolen or lost when a distance between a user and an information processing apparatus 2 is equal to or above a given value. Specifically, the user holds or is in possession of, for example, an output apparatus capable of outputting a certain signal, and the information processing apparatus 2 is provided with a function of receiving the signal outputted from the output apparatus and a function of measuring the distance between the user and the information processing apparatus 2 on the basis of the received signal. Thereby, if the distance between the user and the information processing apparatus 2 is equal to or above the given value, the detection section 30 can detect that the information processing apparatus 2 has been stolen or lost. Furthermore, for example, the detection functions include a detection function of detecting that the information processing apparatus 2 has been stolen or lost if the information processing apparatus 2 exists at a place set by the user in advance. The place set by the user in advance is, for example, a place where the user never goes. Furthermore, for example, the detection functions include a detection function of detecting that the information processing apparatus 2 has been stolen or lost if disassembly of the information processing apparatus 2 is detected. The detection of disassembly of the information processing apparatus 2 is made, for example, when the case of the information processing apparatus 2 is removed. Furthermore, for example, the detection functions also include a detection function of detecting that the information processing apparatus 2 has been stolen or lost if an inputted password is incorrect a given number of times or more times when a password input function is provided for the information processing apparatus 2.

The waiting time recording section 31 records waiting time indicating a time between completion of erasing data stored in one storage area among the multiple storage areas and start of erasing data stored in the other storage area, in association with each of multiple stages detected by the detection section 30. FIG. 6 illustrates an example of the waiting time stored in the waiting time recording section 31 according to an embodiment. That is, the waiting time recording section 31 according to an embodiment records the waiting time as a table 31a. As illustrated in FIG. 6, detection levels and waiting times are recorded in the table 31a.

That is, the table 31a indicates that, if the detection level is "1", one-hour waiting is performed after erasure of data in one storage area is ended until erasure of data stored in the other storage areas is started. Furthermore, the table 31a indicates that, if the detection level is "2", 10-minute waiting is performed after erasure of data in one storage area is ended until erasure of data stored in the other storage areas is started. Furthermore, the table 31a indicates that, if the detection level is "3", waiting is not performed after erasure of data in one storage area is ended until erasure of data stored in the other storage areas is started. That is, if the detection level is "3", the data erasure section 32 starts erasure of data stored in the other storage areas immediately after it erases data stored in one storage area. While a few detection levels are specified in FIG. 6, the present invention is not limited thereto.

If being notified from the detection section 30 that the information processing apparatus 2 has been stolen or lost, the data erasure section 32 erases (destroys) the data stored in each of the multiple storage areas in accordance with the erasure priority rankings recorded in the erasure priority ranking recording section 29. Furthermore, by confirming the detection level generated by the detection section 30, the data erasure section 32 reads the waiting time corresponding to the detection level, from the waiting time recording section 31. The data erasure section 32 erases the data stored in each of the multiple storage areas on the basis of the read waiting time.

Next, the operation of the information processing apparatus 2 according to the above configuration is described in detail with reference to FIGS. 7 to 9.

Figure 7:
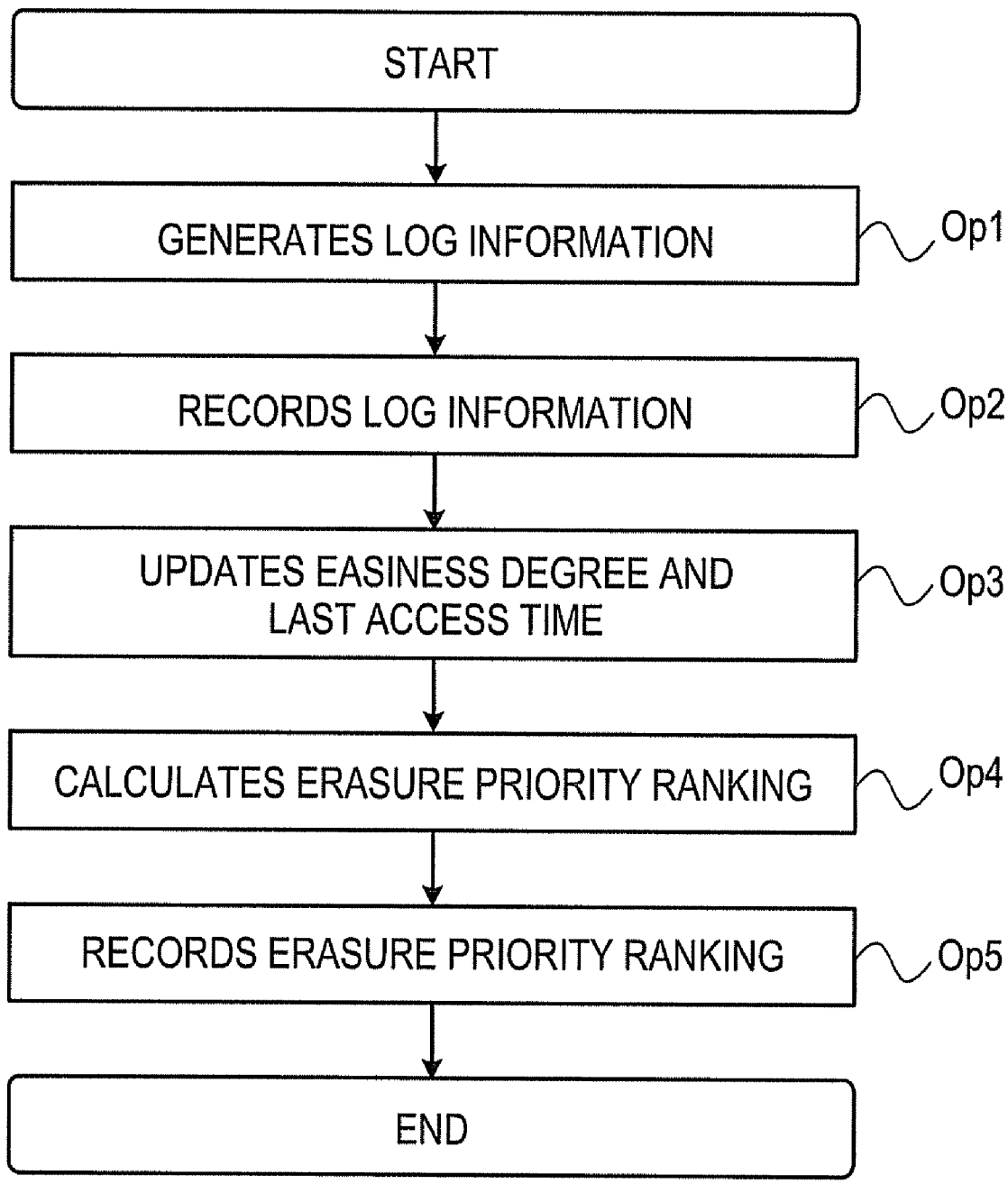
FIG. 7 illustrates an example of an operation of an information processing apparatus in a case where a log information generation section generates log information.

FIG. 7 illustrates an example of an operation of the information processing apparatus 2 in a case where the log information generation section 25 generates the log information. As illustrated in FIG. 7, by detecting states of the information processing apparatus 2 and the backup devices 3, the log information generation section 25 generates log information in which an external storage medium which the information processing apparatus 2 could access, among the multiple external storage media, is illustrated together with time information (Operation Op1). The log information generation section 25 records the log information generated at Operation Op1 into the log information recording section 26 (Operation Op2).

Then, the update section 27 updates the easiness degrees and the last access times recorded in the backup device state recording section 24 on the basis of the log information recorded in the log information recording section 26 (Operation Op3). Then, the erasure priority ranking calculation section 28 calculates the erasure priority ranking of the data stored in each of the multiple storage areas (Operation Op4).

Here, an example of the processing by the erasure priority ranking calculation section 28 at Operation Op4 will be specifically described with reference to FIG. 8.

Figure 8:
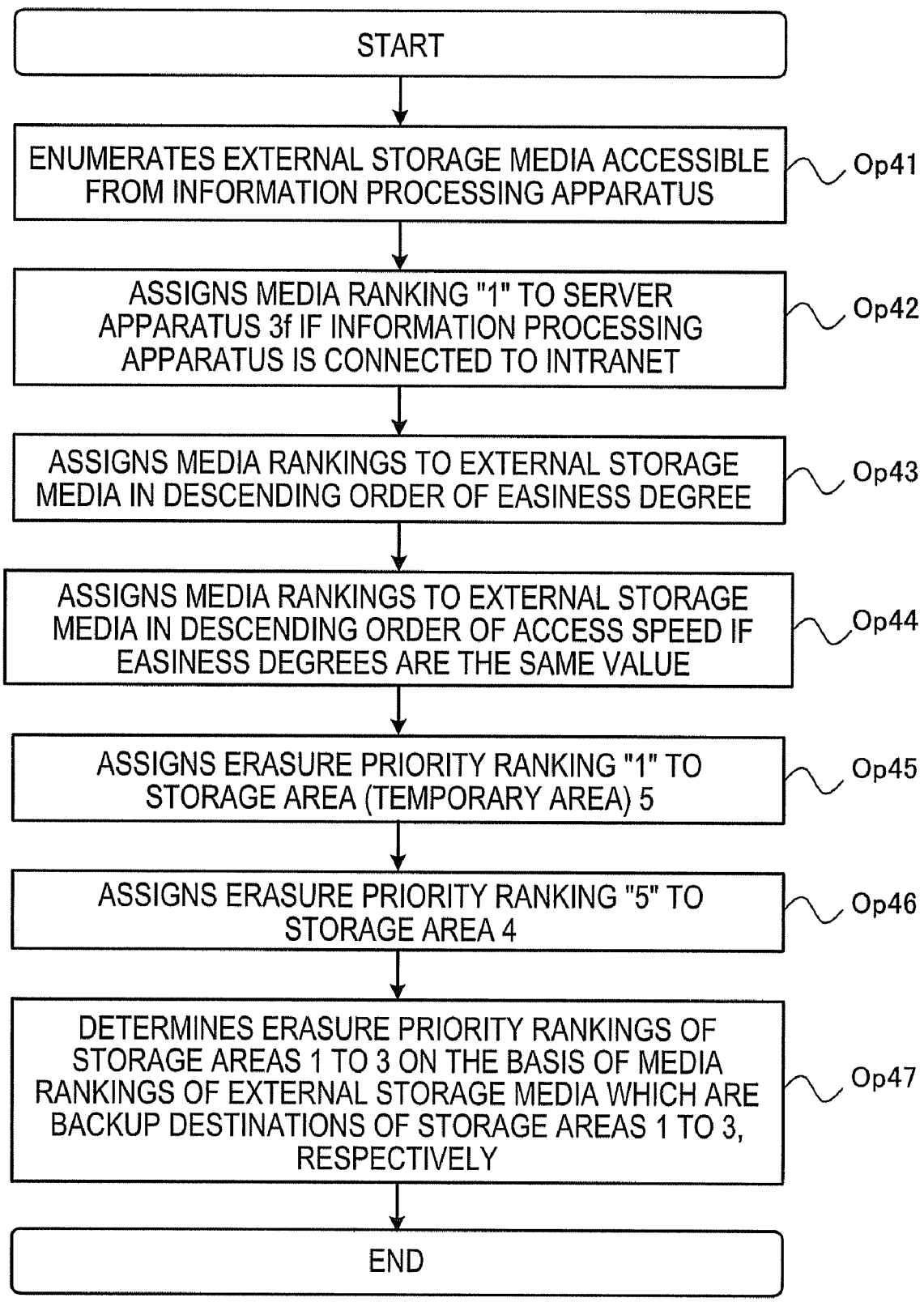
FIG. 8 illustrates an example of an operation of an erasure priority ranking calculation section in the case where it calculates the erasure priority rankings.

FIG. 8 illustrates an example of an operation of the erasure priority ranking calculation section 28 in the case where it calculates erasure priority rankings. As illustrated in FIG. 8, the erasure priority ranking calculation section 28 first enumerates all external storage media accessible from the information processing apparatus 2 (Operation Op41). In an embodiment, it is assumed that the erasure priority ranking calculation section 28 has enumerated the USB memories 3a to 3d and the server apparatuses 3e and 3f.

Then, before calculating the erasure priority ranking of the data stored in each of the multiple storage areas, the erasure priority ranking calculation section 28 performs processing for assigning a media ranking to each of the multiple external storage media enumerated at Operation Op41. That is, the erasure priority ranking calculation section 28 first judges whether the information processing apparatus 2 is connected to an intranet or not, and assigns a media ranking "1" to the server apparatus 3f which exists on the intranet if it judges that the information processing apparatus 2 is connected to the intranet (Operation Op42). Here, in an embodiment, it is assumed that the information processing apparatus 2 is connected to the intranet. Therefore, the erasure priority ranking calculation section 28 according to an embodiment assigns the media ranking "1" to the server apparatus 3f.

Then, the erasure priority ranking calculation section 28 assigns media rankings to the external storage media in a descending order of easiness degree by referring to the backup device state recording section 24 (Operation Op43). Here, in an embodiment, since the media ranking "1" has been assigned to the server apparatus 3f at Operation Op42, the erasure priority ranking calculation section 28 assigns media rankings "2", "3", "4", "4" and "6" to the USB memory 3d (easiness degree: "100"%), the USB memory 3c (easiness degree: "66"%), the USB memory 3a (easiness degree: "33"%), the USB memory 3b (easiness degree: "33"%) and the server apparatus 3e (easiness degree: "0"), respectively.

Then, in the case where easiness degrees are the same, the erasure priority ranking calculation section 28 assigns media rankings to the external storage media in descending order of access speed (Operation Op44). In an embodiment, since both of the easiness degrees of the USB memories 3a and 3b are "33"%, the erasure priority ranking calculation section 28 according to an embodiment assigns media rankings to the USB memory 3b (access speed: "480" Mbps) and the USB memory 3a (access speed: "12" Mbps) in that order. That is, the media rankings of the external storage media are as follows: the media ranking of the server apparatus 3f is "1"; the media ranking of the USB memory 3d is "2"; the media ranking of the USB memory 3c is "3"; the media ranking of the USB memory 3b is "4"; the media ranking of the USB memory 3a is "5"; and the media ranking of the server apparatus 3e is "6".

In FIG. 8, processing may be added in which the erasure priority ranking calculation section 28 assigns a higher media ranking to an external storage medium the information processing apparatus 2 could access within a certain time period until the current time than an external storage medium the information processing apparatus 2 could not access, by referring to the last access times in the backup device state recording section 24.

Next, the erasure priority ranking calculation section 28 performs processing for assigning the erasure priority ranking of the data stored in each of the multiple storage areas to each of the multiple storage areas. That is, the erasure priority ranking calculation section 28 first assigns an erasure priority ranking "1" to the storage area 5 (Operation Op45). That is, in an embodiment, since the storage area 5 is a temporary area, the erasure priority ranking calculation section 28 assigns the erasure priority ranking "1" to the storage area 5 so that the data stored in the storage area 5 is erased first.

Then, the erasure priority ranking calculation section 28 assigns an erasure priority ranking "5" to the storage area 4 where data which has not been backed up to an external storage medium is stored (Operation Op46). That is, in an embodiment, since the data stored in the storage area 4 has not been backed up to an external storage medium yet, the erasure priority ranking calculation section 28 assigns the erasure priority ranking "5" to the storage area 4 so that the data stored in the storage area 4 is erased last. Thereby, even if the detection section 30 makes an erroneous detection, it is possible to reduce the risk of the data stored in the storage area 4, which has not been backed up being erased.

Then, the erasure priority ranking calculation section 28 determines the erasure priority rankings of the storage areas 1 to 3 on the basis of the media rankings of the external storage media which are the backup destinations of the storage areas 1 to 3, respectively (Operation Op47). FIG. 9 is a diagram for illustrating processing for determining the erasure priority rankings of storage areas 1 to 3. As illustrated in FIG. 9, the media rankings of the server apparatuses 3f and 3e, which are the backup destinations of the storage area 1, are "1" and "6", respectively. That is, the media rankings "1" and "6" are assigned to the storage area 1. The media rankings of the server apparatus 3f and the USB memory 3b, which are the backup destinations of the storage area 2, are "1" and "4", respectively. That is, the media rankings "1" and "4" are assigned to the storage area 2. Furthermore, to the USB memories 3d, 3c and 3a, which are the backup destinations of the storage area 3, the media rankings "2", "3" and "5" are assigned, respectively. That is, the media rankings "2", "3" and "5" are assigned to the storage area 3.

Here, the erasure priority ranking calculation section 28 first selects the storage areas 1 and 2, to which the media ranking "1" is assigned, from among the storage areas 1 to 3. Then, the erasure priority ranking calculation section 28 assigns the erasure priority ranking "2" to the storage area 2, to which the media ranking "4" is assigned, between the storage areas 1 and 2. That is, since having assigned the erasure priority ranking "1" to the storage area 5 at Operation Op45, the erasure priority ranking calculation section 28 assigns the next highest erasure priority ranking "2" to the storage area 2. Then, the erasure priority ranking calculation section 28 assigns the erasure priority ranking "3" to the storage area 1, to which the media ranking "6" is assigned, between the storage areas 1 and 2. Then, the erasure priority ranking calculation section 28 assigns the erasure priority ranking "4" to the last remaining storage area 3.

In this way, the erasure priority ranking of the data stored in each of the multiple storage areas can be calculated by the processings of Operations Op45 to Op47.

Returning to FIG. 7, the erasure priority ranking calculation section 28 records the erasure priority rankings calculated at Operation Op4 into the erasure priority ranking recording section 29 (Operation Op5). In an embodiment, the table 29a illustrated in FIG. 5 is recorded into the erasure priority ranking recording section 29.

Figure 10:
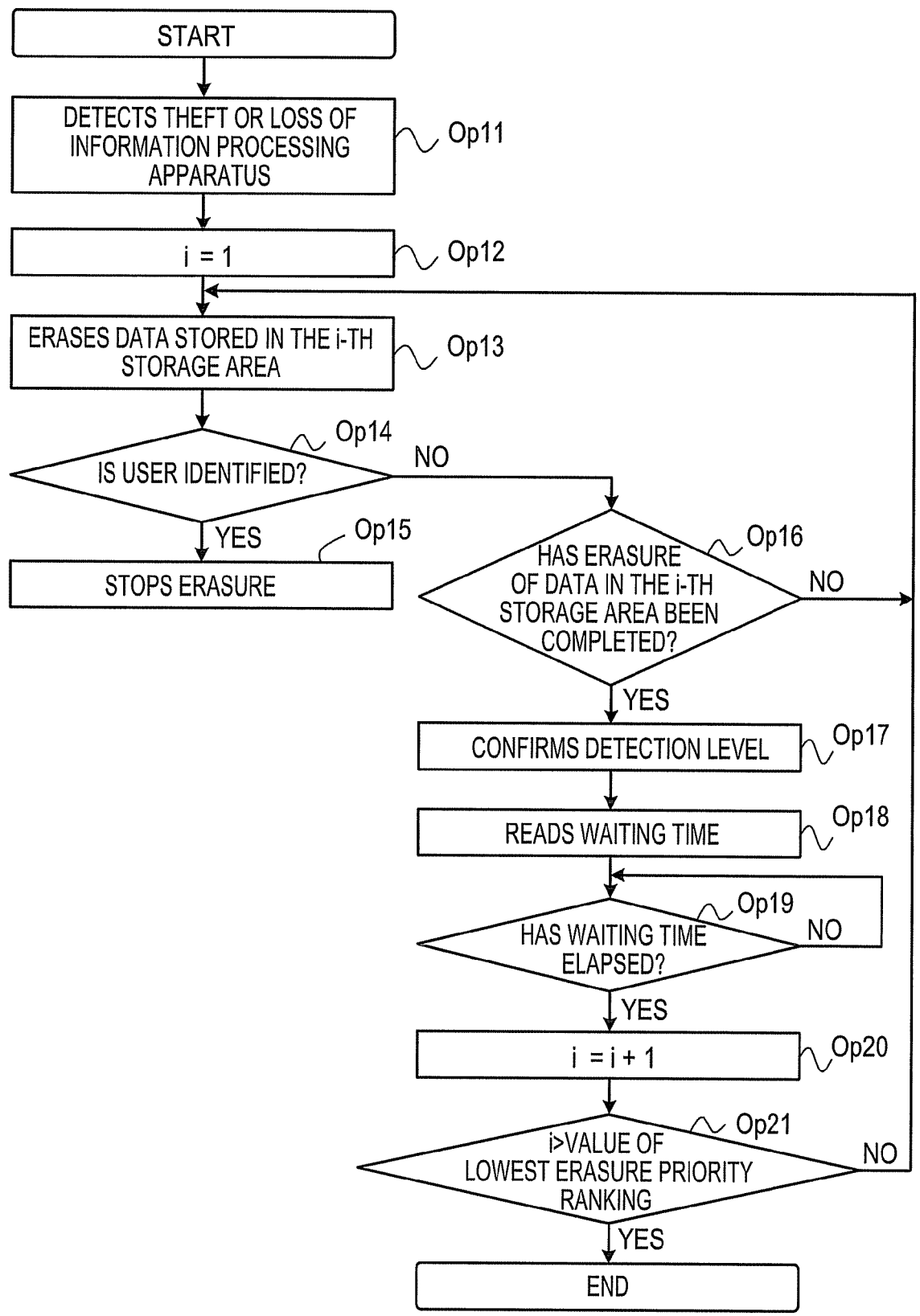
FIG. 10 illustrates an example of operation(s) of an information processing apparatus in a case where a detection section detects theft or loss (or otherwise unauthorized use) of the information processing apparatus.

FIG. 10 illustrates an example of an operation of the information processing apparatus 2 in the case where the detection section 30 detects theft or loss of the information processing apparatus 2. As illustrated in FIG. 10, the detection section 30 detects theft or loss of the information processing apparatus 2 (Operation Op11). Then, the data erasure section 32 initializes a variable i to "1" (Operation Op12). The variable i is a variable indicating an erasure priority ranking. Then, the data erasure section 32 erases data stored in the i-th storage area by referring to the erasure priority ranking recording section 29 (Operation Op13). In this case, the data erasure section 32 locks the erasure priority ranking recording section 29 so that the erasure priority rankings recorded in the erasure priority ranking recording section 29 are not updated by the erasure priority ranking calculation section 28. The data erasure section 32 causes a display screen of the information processing apparatus 2 to display that erasure of the data stored in the storage area has started.

Here, for example, if the detection at Operation Op11 is an erroneous detection, the user performs authentication processing for the information processing apparatus 2. Then, if the user is confirmed to be the user himself (Operation Op14: YES), then the data erasure section 32 stops erasure of the data stored in the i-th storage area (Operation Op15). In this case, the user downloads backup data to the information processing apparatus 2 from an external storage medium in order to restore data which has been erased by the data erasure section 32 among the data stored in the i-th storage area. That is, since erasure of data is first performed for a storage area where data which has been backed up to an external medium with a higher easiness degree is stored, the data erasure section 32 can quickly restore data without troubling the user when he downloads the data generated in the external storage medium by backup to the information processing apparatus 2. On the other hand, if the user is not confirmed to be the user himself (Operation Op14: NO), then the data erasure section 32 judges whether erasure of the data stored in the i-th storage area has been completed or not (Operation Op16).

If judging that erasure of the data stored in the i-th storage area has been completed (Operation Op16: YES), then the data erasure section 32 confirms the detection level generated by the detection section 30 (Operation Op17). On the other hand, if judging that erasure of the data stored in the i-th storage area has not been completed (Operation Op16: NO), then the data erasure section 32 returns to Operation Op13 and continues erasure of the data stored in the i-th storage area.

Then, the data erasure section 32 reads waiting time corresponding to the detection level confirmed at Operation Op17, from the waiting time recording section 31 (Operation Op18). Then, the data erasure section 32 judges whether the waiting time read at Operation Op18 has elapsed or not (Operation Op19). If judging that the waiting time read at Operation Op18 has elapsed (Operation Op19: YES), then the data erasure section 32 adds "1" to the variable i (i=i+1) (Operation Op20). On the other hand, if judging that the waiting time read at Operation Op18 has not elapsed (Operation Op19: NO), then the data erasure section 32 returns to Operation Op19 and repeats the judgment processing of Operation Op19.

Then, the data erasure section 32 judges whether or not the variable i is larger than the value of the lowest erasure priority ranking ("5" in an embodiment) (Operation Op21). If judging that the variable i is larger than the value of the lowest erasure priority ranking (Operation Op21: YES), then the data erasure section 32 judges that all the data stored in each of the multiple storage areas have been erased and ends the processing in FIG. 10. On the other hand, if judging that the variable i is not larger than the value of the lowest erasure priority ranking (Operation Op21: NO), then the data erasure section 32 returns to Operation Op13 and erases the data stored in the i-th storage area.

As described above, according to the information processing apparatus 2 according to an embodiment, the backup management section 23 backs up data stored in multiple storage areas to one or multiple external storage media. The erasure priority ranking calculation section 28 calculates the erasure priority rankings of the data stored in the multiple storage areas in a manner that the erasure priority ranking is higher as the easiness degree is higher. Then, the erasure priority ranking calculation section 28 records the calculated erasure priority rankings into the erasure priority ranking recording section 29 in association with each of the multiple storage areas. If the detection section 30 detects theft or loss of the information processing apparatus 2, the data erasure section 32 erases the data stored in the multiple storage areas in accordance with the erasure priority rankings recorded in the erasure priority ranking recording section 29. Therefore, even in the case where the detection section 30 makes an erroneous detection, since erasure of data is first performed for a storage area where data which has been backed up to an external medium with a higher easiness degree is stored, it is possible to quickly restore the data without troubling the user when he downloads the data generated in the external storage medium by backup to the information processing apparatus 2.

The embodiment(s) described above illustrates one concrete example of an embodiment of the present invention, and various modifications are possible. Some main modification examples will be illustrated below.

In an embodiment described above, an example has been explained in which, if being notified from the detection section 30 that the information processing apparatus 2 has been stolen or lost, the data erasure section 32 erases the data stored in each of the multiple storage areas in accordance with the erasure priority rankings recorded in the erasure priority ranking recording section 29. However, for example, it is also conceivable that the information processing apparatus 2 is stolen or lost with the USB memories 3a to 3c connected to USB connectors of the information processing apparatus 2. In such a case, it is preferable that not only the data stored in the storage section 21 but also the backup data stored in the USB memories 3a to 3c are erased. Therefore, in the first modification example, an example will be described in which, if notified from the detection section 30 that the information processing apparatus 2 has been stolen or lost, the data erasure section 32 erases not only the data stored in the storage section 21 but also the backup data stored in external storage media.

Specifically, if the detection section 30 detects theft or loss (or otherwise loss of control) of the information processing apparatus 2, the erasure priority ranking calculation section 28 first selects external storage media accessible from the information processing apparatus 2 via a local bus by referring to the backup device state recording section 24. That is, in an embodiment described above, the erasure priority ranking calculation section 28 selects the USB memories 3a to 3c. Then, the erasure priority ranking calculation section 28 newly writes the selected external storage media into the storage area of the erasure priority ranking recording section 29. Thereby, the backup data stored in the external storage media is also targeted by erasure by the data erasure section 32.

If data stored in one storage area among the multiple storage areas has been backed up to only one USB memory among the USB memories 3a to 3c, the erasure priority ranking calculation section 28 calculates erasure priority rankings so that the erasure priority ranking of the data stored in the one storage area and the erasure priority ranking of the backup data stored in the one USB memory are the lowest and the second lowest erasure priority rankings. Specifically, the erasure priority ranking calculation section 28 calculates the erasure priority rankings so that the erasure priority ranking of the backup data stored in the one USB memory is the second lowest erasure priority ranking and the erasure priority ranking of the data stored in the one storage area is the lowest erasure priority ranking. Thereby, even if the detection section 30 makes an erroneous detection, it is possible to reduce the risk of the data which has not been backed up being erased.

In an embodiment described above, an example has been explained in which the erasure priority ranking calculation section 28 calculates erasure priority rankings on the basis of easiness degrees of external storage media and access speeds of the external storage media. However, this is not limiting. For example, the erasure priority ranking calculation section 28 may calculate erasure priority rankings only on the basis of easiness degrees of external storage media without taking account of access speeds of the external storage media.

In an embodiment described above, an example has been explained in which one storage area in the storage section 21 is within one block having consecutive addresses, for example, like addresses 0009 to 000A. However, this is not limiting. For example, one storage area in the storage section 21 may be in different two blocks having inconsecutive addresses, for example, like addresses 0009 to 000A and 001F to 00FF. That is, one storage area in the storage section 21 may exist within any number of different blocks having inconsecutive addresses. In this case, it is preferable to set virtual addresses so that the storage area constituted by any number of different partitions having inconsecutive addresses appear to be within one partition having consecutive addresses when seen from the OS of the information processing apparatus 2. By doing so, the data stored in the storage area can be easily erased only by the data erasure section 32 issuing, for example, one erase command. In the case of setting virtual addresses, it is necessary to provide a virtual address/physical address correspondence table for the information processing apparatus 2.

Furthermore, the functions of the storage section 21, erasure priority ranking recording section 29, waiting time recording section 31 and data erasure section 32 described above may be included in one member (apparatus). For example, the functions of the storage section 21, erasure priority ranking recording section 29, waiting time recording section 31 and data erasure section 32 described above are included in an HDD or SDD of the information processing apparatus 2. By doing so, even if the detection section 30 detects theft or loss of the information processing apparatus 2, and the data erasure section 32 starts erasure of data stored in the storage area, it is difficult for a third person who has stolen the information processing apparatus 2 to stop erasure of the data. That is, the tamper resistance of the information processing apparatus 2 is improved.

In an embodiment described above, an example has been explained in which the backup management section 23, the backup device state recording section 24, the log information recording section 26, the erasure priority ranking recording section 29 and the waiting time recording section 31 records information as a table. However, this is not limiting. That is, the form of recording each information into the backup management section 23, the backup device state recording section 24, the log information recording section 26, the erasure priority ranking recording section 29 and the waiting time recording section 31 is not limited to a table form, and any form is possible.

A computer implemented method including calculating an order in which data of multiple storage areas is to be erased in response to an occurrence of an event based on a priority ranking of the data, and erasing each data according to the order calculated when the event is determined to have occurred. As such, an aspect of the invention provides a technique for destroying data based on determined level of ease of access to the data when determining that the data has been compromised.

Any or all of the operations described herein may be implemented via one or more hardware components. However, the present invention is not limited to any specific implementation of an operation. For example, one or more operations discussed herein may be implemented via software executed on a device while others may be executed via a specific hardware device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An information processing apparatus for accessing multiple external storage media, comprising:
   a detection section which detects theft or loss of the information processing apparatus;
   a storage section having multiple storage areas for storing data;
   a backup management section which backs up the data stored in the multiple storage areas to one or multiple external storage media;
   an easiness degree recording section which records, in association with each of the multiple external storage media, an easiness degree indicating how easily a user accesses the external storage medium;
   an erasure priority ranking calculation section which calculates erasure priority rankings of the data stored in the multiple storage areas in a manner that an erasure priority ranking is higher as an easiness degree is higher, and records the calculated erasure priority rankings into an erasure priority ranking recording section in association with each of the multiple storage areas; and
   a data erasure section which erases the data stored in the multiple storage areas in accordance with the erasure priority rankings recorded in the erasure priority ranking recording section when the detection section detects theft or loss of the information processing apparatus.

2. The information processing apparatus according to claim 1, further comprising:
   an access speed recording section which records, in association with each of the multiple external storage media, a speed of the information processing apparatus for accessing the external storage medium, and
   wherein the erasure priority ranking calculation section calculates the erasure priority rankings of the data stored in the multiple storage areas in a manner that the erasure priority ranking is higher as the easiness degree is higher and the access speed is faster.

3. The information processing apparatus according to claim 1, further comprising:
   a log information recording section which records log information showing external storage media which the information processing apparatus could access, among the multiple external storage media, in a time series; and
   an easiness degree update section which updates easiness degrees recorded in the easiness degree recording section based on the log information recorded in the log information recording section.

4. The information processing apparatus according to claim 1, wherein the erasure priority ranking calculation section calculates the erasure priority ranking of each data stored in each of the multiple storage areas in a manner that the erasure priority ranking of data which has not been backed up to an external storage medium by the backup management section is the lowest.

5. The information processing apparatus according to claim 1, wherein the detection section detects theft or loss of the information processing apparatus by stages according to a degree of the theft or loss;
   the information processing apparatus includes a waiting time recording section which records a waiting time after the data erasure section ends erasure of data stored in one storage area among the multiple storage areas until starting erasure of data stored in the other storage areas, in association with each of multiple stages detected by the detection section; and
   the data erasure section reads a waiting time corresponding to a stage at which the detection section detects theft or loss of the information processing apparatus, from the waiting time recording section, and erases each data stored in each of the multiple storage areas based on the read waiting time.

6. A method of an information processing apparatus configured to access a storage section having multiple storage areas for storing data and an easiness degree recording section which records, in association with each of the multiple external storage media, an easiness degree indicating how easily a user accesses the external storage medium, the method comprising:
   detecting theft or loss of the information processing apparatus using a detection section provided for the information processing apparatus;
   backing up the data of the multiple storage areas to one or multiple external storage media using a backup management section provided for the information processing apparatus;
   calculating erasure priority rankings of the data stored in the multiple storage areas in a manner that an erasure priority ranking is higher as an easiness degree is higher, using an erasure priority ranking calculation section provided for the information processing apparatus;
   recording the calculated erasure priority rankings into an erasure priority ranking recording section in association with each of the multiple storage areas, using an erasure priority ranking calculation section provided for the information processing apparatus; and erasing the data stored in the multiple storage areas in accordance with the erasure priority rankings recorded in the erasure priority ranking recording section, using a data erasure section provided for the information processing apparatus, when theft or loss of the information processing apparatus is detected by the detection section.

7. A computer-readable recording medium having stored therein a computer-executable instruction for causing an information processing apparatus to execute an operation including accessing a storage section having multiple storage areas and an easiness degree recording section which records, in association with each of the multiple external storage media, an easiness degree indicating how easily a user accesses the external storage medium, comprising:

detecting theft or loss of the information processing apparatus;

backing up the data stored in the multiple storage areas to one or multiple external storage media;

calculating erasure priority rankings of the data stored in the multiple storage areas in a manner that an erasure priority ranking is higher as an easiness degree is higher;

recording the calculated erasure priority rankings into an erasure priority ranking recording section in association with the multiple storage areas, respectively; and erasing the data stored in the multiple storage areas in accordance with the erasure priority rankings recorded in the erasure priority ranking recording section when theft or loss of the information processing apparatus is detected.

\* \* \* \* \*

UNITED STATES PATENT AND TRADEMARK OFFICE
CERTIFICATE OF CORRECTION

PATENT NO. : 8,365,296 B2
APPLICATION NO. : 12/500919
DATED : January 29, 2013
INVENTOR(S) : Kouichi Yasaki et al.

Page 1 of 1

It is certified that error appears in the above-identified patent and that said Letters Patent is hereby corrected as shown below:

On the Title Page Col. 2 (Other Publications); Line 2, Delete "Retrievd" and insert -- Retrieved --, therefor.

Signed and Sealed this
Twenty-eighth Day of May, 2013

Teresa Stanek Rea
*Acting Director of the United States Patent and Trademark Office*